United States Patent
Ford

(10) Patent No.: US 9,476,549 B2
(45) Date of Patent: Oct. 25, 2016

(54) FLEXIBLE LIGHT SHIELD AND DIFFUSER

(75) Inventor: Timothy D. F. Ford, Beaconsfield (CA)

(73) Assignee: THE FLEWELLING FORD FAMILY TRUST, Beaconsfield (CA)

(*) Notice: Subject to any disclaimer, the term of this patent is extended or adjusted under 35 U.S.C. 154(b) by 285 days.

(21) Appl. No.: 12/341,125

(22) Filed: Dec. 22, 2008

(65) Prior Publication Data

US 2009/0168436 A1 Jul. 2, 2009

Related U.S. Application Data

(60) Provisional application No. 61/015,758, filed on Dec. 21, 2007.

(51) Int. Cl.
| | | |
|---|---|---|
| *F21V 11/00* | (2015.01) | |
| *F21L 4/02* | (2006.01) | |
| *F21V 3/04* | (2006.01) | |
| *F21V 17/00* | (2006.01) | |
| *F21V 17/14* | (2006.01) | |
| *F21Y 101/02* | (2006.01) | |

(52) U.S. Cl.
CPC ............ *F21L 4/027* (2013.01); *F21V 3/04* (2013.01); *F21V 17/007* (2013.01); *F21V 17/14* (2013.01); *C08L 2201/12* (2013.01); *F21Y 2101/02* (2013.01)

(58) Field of Classification Search
CPC .............. F21L 15/04; F21L 4/027; F21V 3/04–3/0409
USPC ............................................ 362/355–356
See application file for complete search history.

(56) References Cited

U.S. PATENT DOCUMENTS

| | | | | |
|---|---|---|---|---|
| 2,823,300 | A * | 2/1958 | Graubner | 362/186 |
| 4,231,077 | A * | 10/1980 | Joyce et al. | 362/577 |
| 4,546,416 | A | 10/1985 | Pemberton | |
| 4,697,228 | A | 9/1987 | Mui et al. | |
| 4,716,902 | A * | 1/1988 | Swartz | 606/234 |
| 4,782,433 | A | 11/1988 | Rombough | |
| 5,383,103 | A * | 1/1995 | Pasch et al. | 362/102 |
| 5,519,593 | A * | 5/1996 | Hasness | A45F 5/02 362/103 |
| 5,857,761 | A * | 1/1999 | Abe et al. | 362/551 |
| 6,909,360 | B2 | 6/2005 | Chen | |
| 7,252,401 | B1 | 8/2007 | Plaszcz | |
| 7,722,201 | B2 * | 5/2010 | Manger | 362/18 |
| 2001/0050371 | A1 * | 12/2001 | Odaki et al. | 257/98 |
| 2009/0168436 | A1 | 7/2009 | Ford | |

* cited by examiner

*Primary Examiner* — Sean Gramling
(74) *Attorney, Agent, or Firm* — Hugh Mansfield

(57) ABSTRACT

A flexible shield/diffuser attachment for a portable light, the light comprising a light emitting end emitting light generally along an axis is shown. The attachment comprises an elongated hollow body fabricated from a pliable material and having a shape memory. A first end of said hollow body is secured to the light emitting end coaxial with the axis.

14 Claims, 6 Drawing Sheets

FLEXIBLE LIGHT SHIELD AND DIFFUSER

CROSS REFERENCE TO RELATED APPLICATIONS

This application claims priority, under 35 U.S.C. §119(e), of U.S. provisional application Ser. No. 61/015,758, filed on Dec. 21, 2007. All documents above are incorporated herein in their entirety by reference.

FIELD OF THE INVENTION

The present invention relates to a flexible light shield and diffuser. More specifically, it relates to a flexible light shield and diffuser attachment adapted to be coupled to a portable light such as a flashlight.

BACKGROUND OF THE INVENTION

As known in the art, flashlight wand attachments are used as illumination, notification, alerting and identification devices in a variety of applications. These devices typically comprise a rigid and hollow elongated body member, which diffuses light emitted by the flashlight (or other handheld signalling device) they are mounted on. Typically, the wand attachment is fastened to the flashlight by means of threads, a latch or the like. One drawback of such rigid wand attachments is that, when mounted on the signalling device, the wand attachment is obstructive and the overall device is not compact and cannot be easily carried or stored in confined spaces (e.g. a pocket or purse). Additionally, as such wands are relatively long, misuse, for example by a user falling on top of the wand, can lead to injury or eventual death, in particular when the wand is broken during such misuse.

Consequently, there exists a need for a shield/diffuser attachment attachment, which, when mounted on a signalling device, allows for the latter to be easily carried and stored, but returns to its original shape when in use.

SUMMARY OF THE INVENTION

The present invention addresses the above and other drawbacks by providing a flexible shield/diffuser attachment for a portable light, the light comprising a light emitting end emitting light generally along an axis. The attachment comprises an elongated hollow body fabricated from a pliable material and having a shape memory. A first end of said hollow body is secured to the light emitting end coaxial with the axis.

There is also disclosed a kit for adapting a flashlight comprising a barrel and a light emitting end to a light shield/diffuser attachment. The kit comprises at least one collar comprising an aperture having a diameter greater than a diameter of the barrel and less than a diameter of the light emitting end and an elongate cylindrical hollow body fabricated from translucent material having a shape memory. When in use the collar is placed over the barrel and the hollow body secured to the collar and the light emitting end.

DETAILED DESCRIPTION OF THE ILLUSTRATIVE EMBODIMENTS

Figure 1:
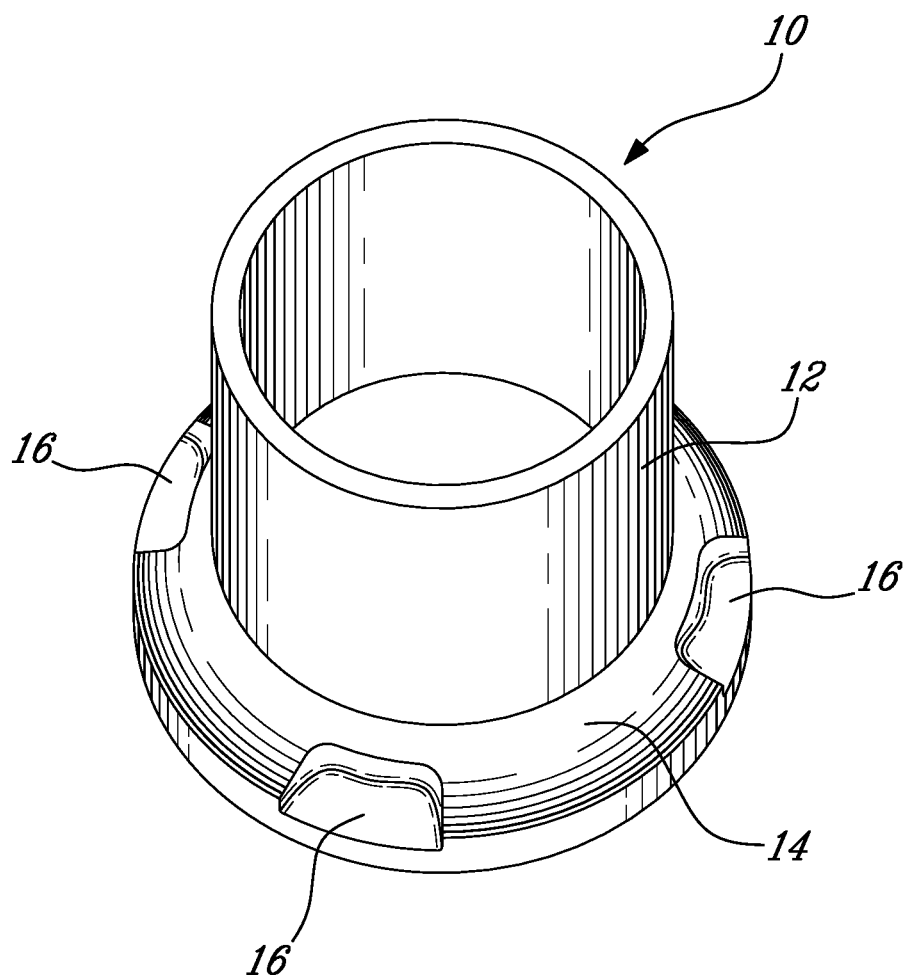
FIG. 1 is a top perspective view of a flexible light shield and diffuser attachment in accordance with an illustrative embodiment of the present invention.

Referring now to FIG. 1, a flexible light shield and diffuser attachment, generally referred to using the numeral 10, will be described. The shield/diffuser attachment 10 comprises an open-ended elongated hollow body 12 and a flange 14 at one end thereof. In a preferred embodiment, the flange 14 comprises evenly spaced recesses as in 16, which ease gripping of the shield/diffuser attachment 10, as will be described herein below.

Figure 2A:
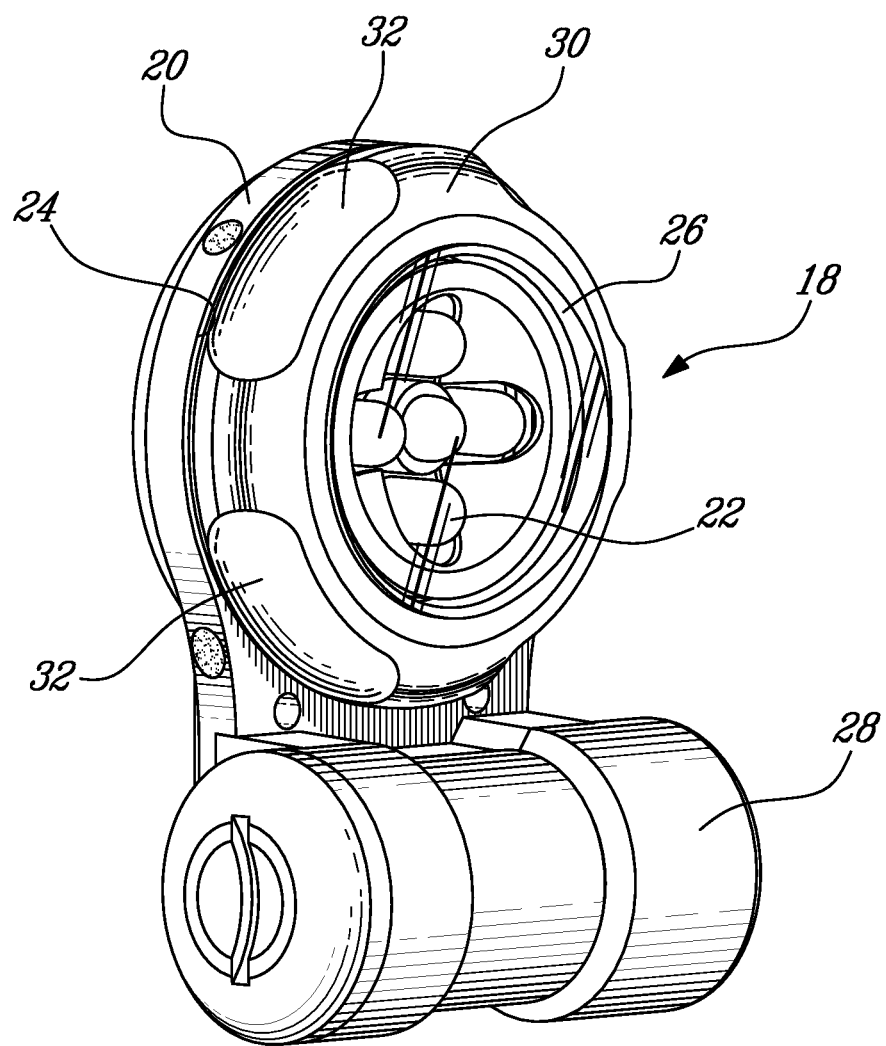
FIGS. 2a, 2b, and 2c provide side perspective, top plan and side plan views of a flexible light shield and diffuser attachment mounted on a portable signalling device in accordance with an illustrative embodiment of the present invention.
Figure 2B:
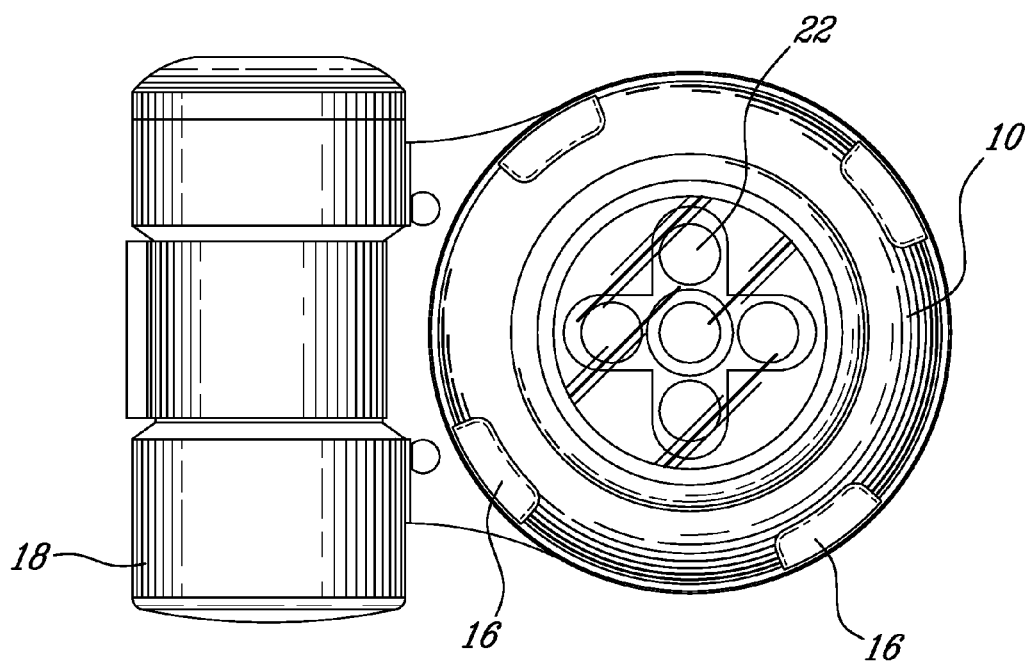

Referring now to FIGS. 2a and 2b in addition to FIG. 1, the shield/diffuser attachment 10 is mounted on a flashlight, signaling device or the like 18. The device 18 is illustratively comprised of a rugged housing 20 fabricated from a durable material, such as plastic. A series of light emitting diodes (LEDs) as in 22 are mounted on the front face 24 of the housing 20 and protected by a dome shaped lens cap 26. The cap 26 is illustratively fabricated from a transparent or translucent material such as clear or opaque plastic, or clear plastic with a diffusing pattern etched in a surface thereof. The housing 20 also illustratively includes a compartment 28, which houses a battery (not shown) for supplying power to the electronics (not shown) which power the LEDs 22 when the device 18 is activated. The device 18 also includes a switch mechanism such a multi-position bezel-like rotary switch 30 mounted around the lens cap 26. By rotating the switch 30 in a clockwise or counter-clockwise direction, one of a number of instruction sets can be selected for powering the LEDs 22. The switch 30 comprises recesses as in 32, which ease gripping of the switch 30 when the latter is being rotated.

Figure 2C:
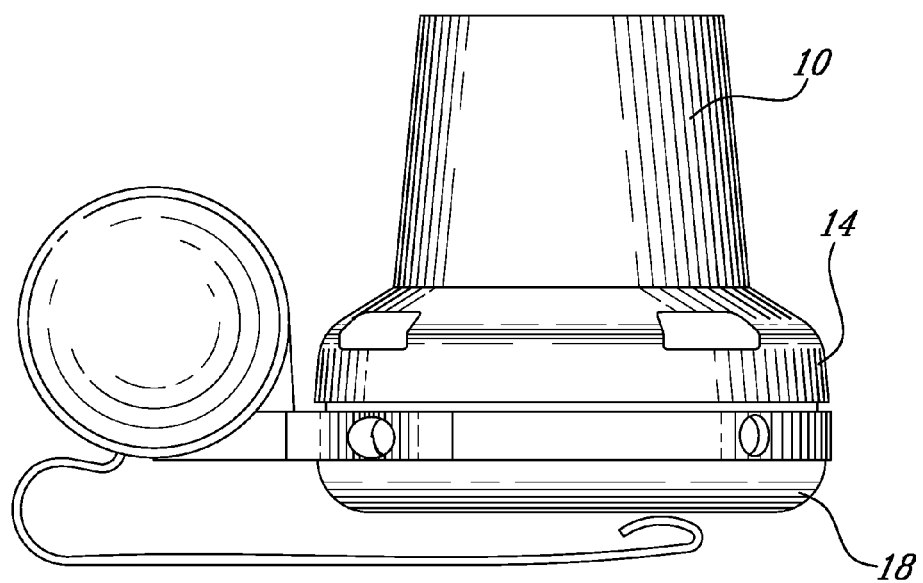

Still referring to FIGS. 2a, 2b and 2c in addition to FIG. 1, the flange 14 of the shield/diffuser attachment 10 is shaped to snugly fit over the switch 30 in order to avoid impairing the use of the latter. In addition, when mounting the shield/diffuser attachment 10 to the device 18, the recesses 16 of the shield/diffuser attachment 10 are preferably fitted over the recesses 32 provided on the switch 30. As a result, the flange 14 can be easily gripped (by placing the operator's fingers into the recesses 16) and rotated, thereby rotating the switch 30 at the same time. Indeed, as will be apparent to a person of skill in the art, the rotary motion induced on the flange 14 is transmitted to the rotary switch 30. The signalling device 18 can therefore still be operated and an instruction set selected for powering the LEDs 22 with the shield/diffuser attachment 10 mounted thereon.

Figure 3A:
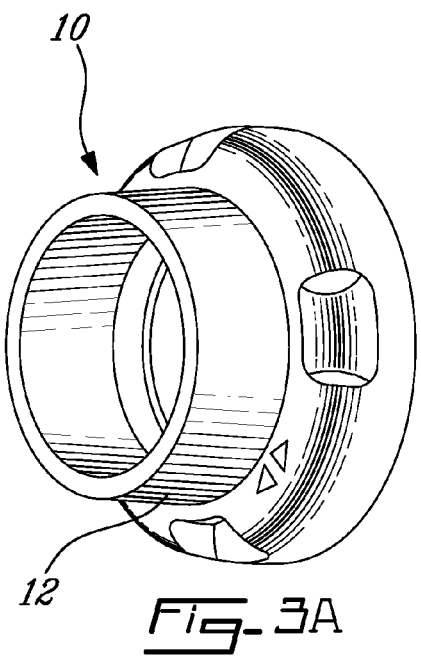
FIGS. 3a, 3b, and 3c provide side plan views of a flexible flashlight shield and diffuser attachment in accordance with different illustrative embodiments of the present invention.
Figure 3B:
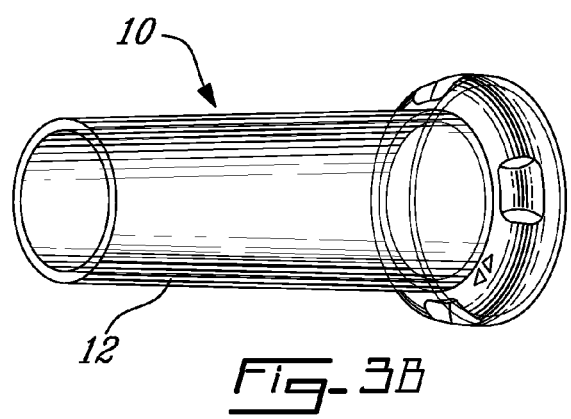
Figure 3C:
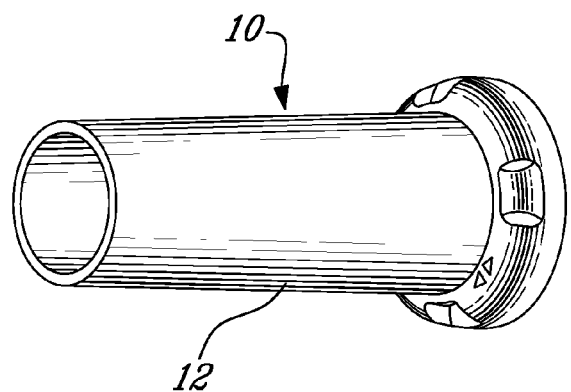

Referring now to FIGS. 3a, 3b and 3c in addition to FIGS. 1 through 2c, the body 12 of the shield/diffuser attachment 10 is preferably entirely fabricated from a flexible material, such as silicon or rubber or the like, which retains memory of its shape such that once collapsed the shield/diffuser 10 will return to its original shape. This will allow the shield/diffuser attachment 10 to be pliable and thus the overall device (or the shield/diffuser attachment 10 alone) can easily be stored in confined spaces such as pockets, purses and the like. Such a design makes the overall device more compact and rugged, as it is not easily broken when stored or carried. The shield/diffuser attachment 10 design of the present invention has the additional advantage of alleviating the need for tools for mounting the shield/diffuser attachment 10 to the signalling device 18. As a result, it will be apparent that the overall construction of the signalling device is cost effective.

Still referring to FIGS. 3a, 3b and 3c in addition to FIGS. 1 through 2c, in addition to being flexible, the body 12 of the shield/diffuser attachment 10 may be opaque (FIGS. 3a and 3c) or transparent or translucent (FIG. 3b). For this purpose, clear or tinted rubber may for example be used. The body 12 may further vary in length, shape and size according to the desired signalling application. For example, the body 12 could have a truncated cone (FIG. 3b) or a cylindrical shape (FIG. 3c).

Still referring to FIGS. 3a, 3b and 3c in addition to FIGS. 1 through 2c, when the signalling device 18 is in operation, the light emitted by the LEDs 22 is directed by the shield/diffuser attachment 10, which is thereby more readily visible at great distances. Indeed, the upper end of the hollow body 12 preferably has an opening formed therein, which allows for a portion of the light emitted by the LEDs 22 to pass through the body 12 unobstructed. This design further eliminates the need for removing the shield/diffuser attachment 10 when such unobstructed light is desired. In addition, when the shield/diffuser attachment 10 is made of transparent or translucent material, the body 12 is illuminated when the signalling device 18 is in operation, thus increasing the visibility of the overall device.

Figure 4:
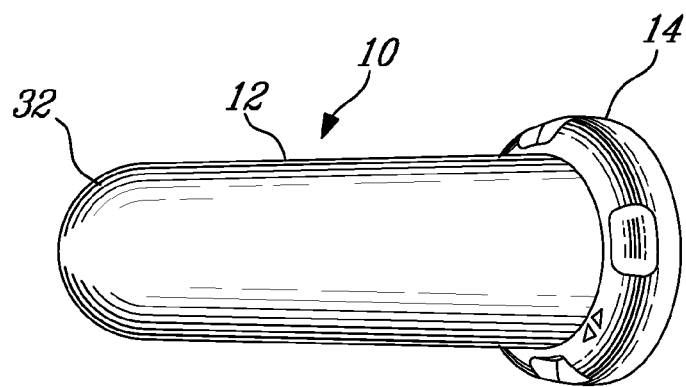
FIG. 4 is a side perspective view of a flexible light diffuser attachment in accordance with an alternative illustrative embodiment of the present invention.

Referring now to FIG. 4, in an alternative illustrative embodiment of a shield/diffuser attachment 10 in accordance with the present invention the hollow body 12 can be translucent with a closed and tipped with a translucent dome 34. The dome 34 serves to disburse light which would otherwise exit the end of the hollow body 12 as well as improve suction such that when the flange 14 is mounted on the end of a flashlight or the like (not shown) the gripping for exerted by the flange 14 on the end of the flashlight is improved.

Figure 5:
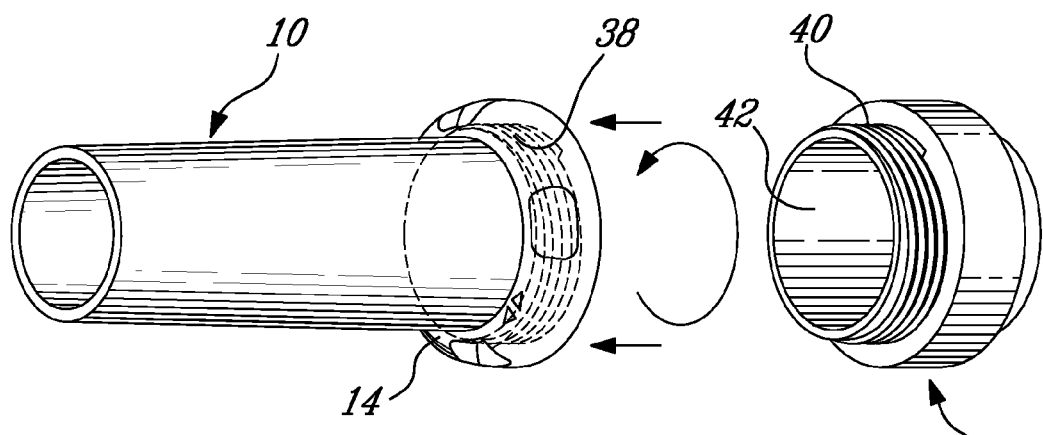
FIG. 5 is a side exploded perspective view of a flexible light shield and diffuser together with a collar attachment in accordance with a second alternative illustrative embodiment of the present invention.

Referring now to FIG. 5, in a second alternative illustrative embodiment of the present invention the flange 14 of the shield/diffuser attachment 10 includes an inner surface adapted to mate with a corresponding hollow collar 36. In operation, the barrel of the flashlight (not shown) is inserted into hollow collar 36 and a threaded inner surface 38 of the flange is illustratively threaded onto a corresponding threaded outer surface 40 of the hollow collar 36, thereby securing the shield/diffuser attachment 10 to the collar 36 over the end of the flashlight. The diameter of the aperture 42 of the collar 36 is suitably chosen to have a diameter greater than a diameter of the barrel of the flashlight and less than a diameter of the light emitting end of the flashlight. Typically, the collar 36 is provided in a kit with a plurality of collars as in 36 each adapted to the barrel diameter of a particular flashlight.

In an alternative embodiment, the threaded interconnection can be replaced with another suitable type of interconnection such as a snap fit, friction fit or the like.

Figure 6:
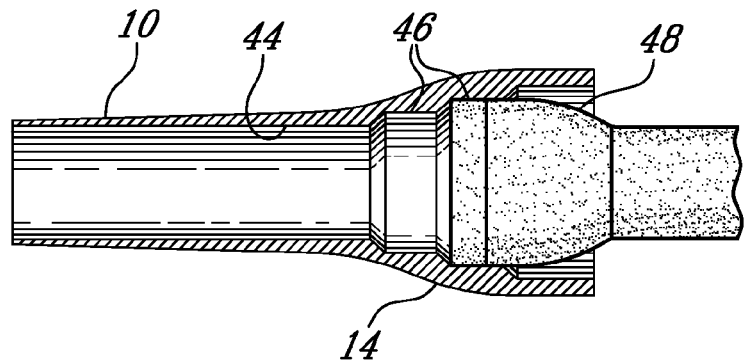
FIG. 6 is a sectional view of a flexible light shield and diffuser attachment in accordance with a third alternative illustrative embodiment of the present invention.

Referring now to FIG. 6, in a third alternative illustrative embodiment of a shield/diffuser attachment 10 in accordance with the present invention, the inner surface 44 of the flange 14 comprises a series of steps 46, thereby allowing the shield/diffuser attachment 10 to adapt to a variety of different flashlights as in 48 having different head diameters. Additionally, in a variant of the same, the shield/diffuser attachment 10 can be translucent with a closed end such as a translucent dome or the like which, as discussed above, through suction can improve the fit between the flange 14 and the flashlight 48.

Although the present invention has been described hereinabove by way of specific embodiments thereof, it can be modified, without departing from the spirit and nature of the subject invention as defined in the appended claims.

What is claimed is:

1. A flexible shield/diffuser attachment for a portable light, the light comprising a light emitting end having an outer surface and emitting light generally along an axis, the attachment comprising:
   an elongated hollow body fabricated from a translucent light diffusing rubberlike material having a shape memory wherein said hollow body returns to its original shape after being collapsed; and
   a flange fabricated from a rubberlike material at a first end of said hollow body, said flange for securing said elongated hollow body to the portable light by snugly gripping in a friction fit the outer surface of the light emitting end coaxial with the axis;
   wherein a diameter of said hollow body does not increase between said first end and a second free end and wherein the light emitting end comprises one of a plurality of diameters, wherein said inner surface comprises a series of progressively smaller diameter concentric rings, and further wherein each of said rings is adapted to fit a different corresponding one of said plurality of diameters.

2. The flexible shield/diffuser attachment of claim 1, wherein said hollow body is frusto-conical and further wherein said first end comprises a wide end of said frusto-conical body.

3. The flexible shield/diffuser attachment of claim 1, wherein said hollow body is translucent and a second end of said hollow body is closed.

4. The flexible shield/diffuser attachment of claim 3, wherein closed end is domed.

5. The flexible shield/diffuser attachment of claim 1, wherein a first end of said hollow body comprises a flange having an inner surface such that when installed on the light emitting end said inner surface exerts a gripping force against the light emitting end thereby securing the elongated hollow body to the light emitting end coaxial with the axis.

6. A kit for adapting a flashlight comprising a barrel and a light emitting end emitting light generally along an axis to a light shield/diffuser attachment, the kit comprising:
   a plurality of collars, each collar comprising an aperture having a diameter greater than a diameter of the barrel and less than a diameter of the light emitting end, wherein each of said plurality of collars comprises an aperture of a differing predetermined diameter; and
   an elongate cylindrical hollow body fabricated from a translucent light diffusing rubberlike material having a shape memory wherein said hollow body returns to its original shape after being collapsed;
   wherein in use the barrel of the flashlight is inserted into said collar and said hollow body secured to said collar over the light emitting end coaxial with the axis.

7. The kit of claim 6, wherein said hollow body is secured to said collar using a thread on an inner surface of a first end of said hollow body and a corresponding thread on an outer surface of said collar.

8. The kit of claim 6, wherein said hollow body is secured to said collar using a snap fit connection between a first end of said hollow body and said collar.

9. The kit of claim 6, wherein said hollow body is secured to said collar using a friction fit between said first end and said collar.

10. The kit of claim 6, wherein said rubberlike material is selected from the group consisting of silicone and rubber.

11. A light wand comprising:
   a light source emitting a constant light generally along an axis and comprising a first part arranged for rotation relative to a second part, said light source activated and deactivated by rotating said first part relative to said second part about said axis;
   an elongated hollow body fabricated from a translucent light diffusing rubberlike material having a shape memory wherein said hollow body returns to its original shape after being collapsed;
   wherein said second part is adjacent a first end of said first part and an attaching end of said hollow body is attached to a second end of said first part opposite said first end and coaxial with the axis, said hollow body rotating with said first part and further wherein a diameter of said hollow body does not increase between said attaching end and a free end.

12. The light wand of claim 11, wherein said hollow body tapers inwards between said first end and said second end.

13. The light wand of claim 11, wherein said rubberlike material is selected from the group consisting of silicone and rubber.

14. The light wand of claim 11, further comprising a flange fabricated from a rubberlike material at a first end of said hollow body for securing said elongated hollow body to the portable light by snugly gripping in a friction fit the first part.

* * * * *